United States Patent
Dev (10) Patent No.: US 10,621,175 B2
(45) Date of Patent: Apr. 14, 2020

(54) RULE EXECUTION BASED ON CONTEXT DATA

(71) Applicant: SAP SE, Walldorf (DE)

(72) Inventor: Nipun Dev, Bangalore (IN)

(73) Assignee: SAP SE, Walldorf (DE)

( * ) Notice: Subject to any disclaimer, the term of this patent is extended or adjusted under 35 U.S.C. 154(b) by 658 days.

(21) Appl. No.: 15/385,876

(22) Filed: Dec. 21, 2016

(65) Prior Publication Data
US 2018/0173706 A1     Jun. 21, 2018

(51) Int. Cl.
*G06F 17/30* (2006.01)
*G06F 16/2455* (2019.01)
*G06F 16/25* (2019.01)

(52) U.S. Cl.
CPC ...... *G06F 16/24565* (2019.01); *G06F 16/252* (2019.01)

(58) Field of Classification Search
CPC ..................... G06F 16/24565; G06F 16/252
See application file for complete search history.

(56) References Cited

U.S. PATENT DOCUMENTS

| | | |
|---|---|---|
| 6,799,166 B2 | 9/2004 | Dorrance et al. |
| 7,996,371 B1 | 8/2011 | Deshmukh et al. |
| 8,577,371 B2 | 11/2013 | Arora et al. |
| 8,639,848 B2 | 1/2014 | Fremantle |
| 9,154,615 B1 | 10/2015 | Hegde et al. |
| 9,413,852 B2 | 8/2016 | Lawson et al. |
| 2009/0176520 A1 | 7/2009 | B.S. et al. |
| 2009/0234958 A1 | 9/2009 | Lee |
| 2011/0137960 A1 | 6/2011 | Price et al. |
| 2012/0166377 A1 | 6/2012 | Sathish et al. |
| 2012/0311130 A1 | 12/2012 | Zadig |
| 2013/0110794 A1 | 5/2013 | Lee |
| 2014/0280138 A1* | 9/2014 | Li ............ G06F 16/00 707/737 |
| 2015/0019553 A1* | 1/2015 | Shaashua ........ H04W 4/70 707/737 |

(Continued)

OTHER PUBLICATIONS

Naveen A N et al; "Client Side Deduplication Scheme for Secured Data Storage in Cloud Environments"; published in "International Journal of Engineering Research & Technology"; vol. 4 Issue 05, May 2015; 3 pages; https://www.ijert.org/view-pdf/13329/client-side-deduplication-scheme-for-secured-data-storage-in-cloud-environments.

(Continued)

*Primary Examiner* — Jared M Bibbee
(74) *Attorney, Agent, or Firm* — Fish & Richardson P.C.

(57) ABSTRACT

Various embodiment of systems and methods to execute a rule based on context data has been described. Initially a trigger to initiate execution of the rule is received at a context processing service. A plurality of context parameters included in the rule are then identified. Context data corresponding to the plurality of context parameters from a context database are then retrieved. Context data may be received from a plurality of context providers including: an Internet of Things (IoT) network; and an application executing at a portable electronic device. Based on the retrieved context data, the rule is executed at the context processing service. Finally an action is executed corresponding to the rule based on execution of the rule.

20 Claims, 5 Drawing Sheets

(56) References Cited

U.S. PATENT DOCUMENTS

| | | | |
|---|---|---|---|
| 2015/0199395 A1* | 7/2015 | Greenstein | G06F 16/211 |
| | | | 707/611 |
| 2016/0094936 A1 | 3/2016 | Yang et al. | |
| 2016/0232195 A1 | 8/2016 | Davis | |
| 2016/0247205 A1 | 8/2016 | Ziliacus et al. | |
| 2016/0321315 A1* | 11/2016 | Scagnol | G06F 8/654 |
| 2017/0160892 A1* | 6/2017 | Lu | H04L 67/22 |
| 2017/0302725 A1 | 10/2017 | Carr et al. | |
| 2017/0325067 A1* | 11/2017 | Greenberger | H04W 4/025 |
| 2018/0007099 A1 | 1/2018 | Ein-Gil et al. | |
| 2018/0052873 A1* | 2/2018 | DeLuca | G06F 16/90324 |
| 2018/0173786 A1 | 6/2018 | Dev | |
| 2019/0163796 A1* | 5/2019 | Hodge | G06F 16/211 |

OTHER PUBLICATIONS

M Jayanthi; "Avoiding duplicates using Randomized Protocols in Cloud"; published in International Journal of Computer Science and Information Technology, 2015; 1 (2); pp. 24-26: http://iaard.net/images/Avoiding%20duplicates%20using%20Randomized%20Protocols%20in%20Cloud.pdf.

GetCloudServices team; "Optimizing VDI Virtual Desktop Performance in Distributed Clouds"; 5 pages, retrieved on Aug. 29, 2016 from http://www.getcloudservices.com/blog/optimizing-vdi-virtual-desktop-performance-in-distributedclouds/.

Don MacVittie; "Stop Repeating Yourself. Deduping WAN-Opt Style"; published on-line on Jun. 30, 2010; 4 pages; http://www.cloudcomputingexpo.com/node/1451790.

Non-final Office Action issued in U.S. Appl. No. 15/386,027 dated Sep. 13, 2019, 19 pages.

* cited by examiner

RULE EXECUTION BASED ON CONTEXT DATA

BACKGROUND

Internet of Things (IoT) and mobile application (app) markets have grown in parallel over the past decade. The IoT is a network of physical devices, vehicles, home appliances, etc., that have an internet address. These devices are embedded with electronics, sensors, actuators, which collect data and then transfer it using an interact connection. The data received from the IoT devices is presently being used to control these devices from remote locations.

The mobile apps on the other hand provide various functionalities to a user of these apps. At present, the different functionalities provided by the mobile app are based on data available over the interact or enterprise data stored in databases. Therefore, there is a need to provide a system that records data from mobile devices, mobile applications and/or IoT devices, generate context data, and perform actions based on the recorded context data.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of system and method for rule execution based on context data are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
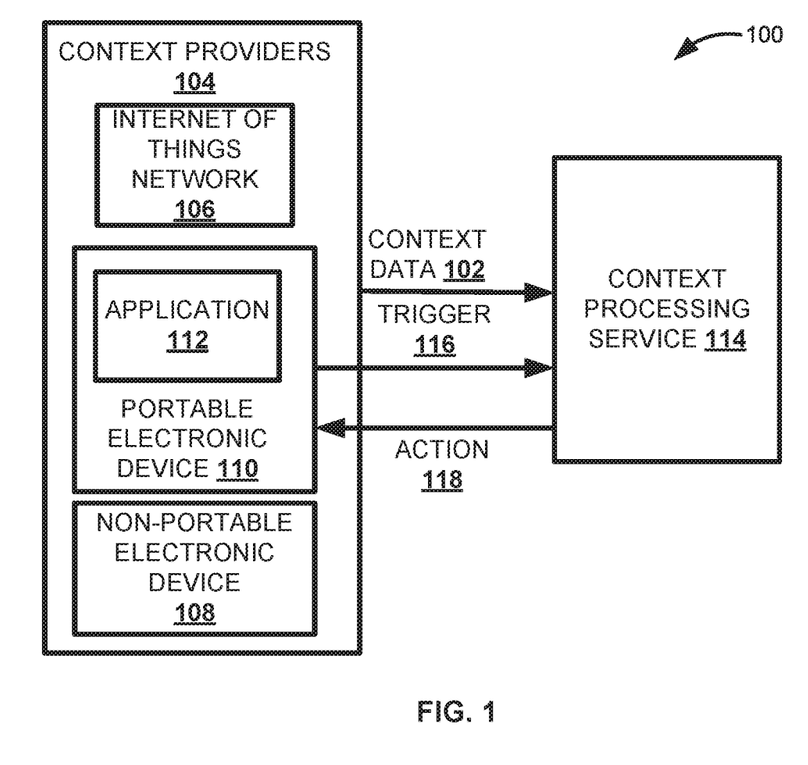
FIG. 1 is a block diagram illustrating a system for rule execution based on context data, according to an embodiment.

FIG. 1 is a block diagram illustrating a system 100 for rule execution based on context data 102, according to an embodiment. Context data 102 is a data received from context providers 104. In one embodiment, the context providers 104 include any device or application executing on the device that records context data 102. For example, the context providers 104 may include an internet of things (IoT) network 106, a non-portable electronic device 108, and a portable electronic device 110 including an application 112 executing on the portable electronic device 110. The context data 102 may be data related to the context providers 104 or to a user of the context providers 104. For example, context data 102 may be data related to devices in an Internet of Things (IoT) network 106, the non-electronic device 108, or the portable electronic device 110. The context data 102 may also include data related to the users of the devices in the IoT network 106, the non-portable electronic device 108, or the portable electronic device 110. For example, context data may be data related to network connectivity of a portable electronic device 110 included in the context providers 104 or data related to identity, time, emotional state, etc. of a user of the portable electronic device 110. In one embodiment, the portable electronic device 110 may include, for example, a mobile phone, smartphone, smart watch, laptop, tablet, etc. The non-portable electronic device 108 may include personal computers, printers, etc.

In one embodiment, an IoT network 106 refers to a network of devices that have a unique Internet Protocol (IP) address for communicating between the network of devices and other Internet-enabled devices and systems. Different IoT devices in the IoT network 106 may include different context data collecting elements, for example heat sensors, GPS tracker, user's calendar tracker, etc., to collect context data. The portable electronic device 110 including the application 112 of the portable electronic device 110, and the non-portable electronic device 108 may similarly collect context data 102 either based on sensors or user inputs, including user preferences, received at the application 112. The context providers 104 may then transmit the collected context data 102 to a context processing service 114. In one embodiment, the context processing service 114 is a cloud service. In one embodiment, a cloud service is a resource that is provided over the Internet. The context processing service 114 may expose a plurality of APIs for communicating with the different context providers 104.

The context processing service 114 may store pre-defined context profiles that are defined for the application 112. In one embodiment, an application 112, for example, a mobile application, is a software application designed to run on the portable electronic device 110. The application 112 may send context data 102 to the context processing service 114. A context profile, corresponding to the application 114, defines a template for receiving, storing, managing, recording, and exposing context data. The context profile may include several context parameters related to a particular context profile. For example, the context profile may include context parameters that are defined to receive a user context data, a device context data, or an application context data. A context profile that includes a context parameter to receive a user context data may include a location parameter, a time parameter, and custom context parameter for the application. The location parameter may be defined to receive a location context data related to the user, the time parameter may be defined to receive different time related parameters (time of the day, current season, etc.). The custom context parameter may include different custom context parameters defined for the user.

The context processing service 114 also stores several rules for processing the context data 102. A rule defines a condition that when satisfied results in execution of an action. A rule may include a set of conditions (facts) and a set of actions that may be performed when the set of facts are true. For example, a fact for a rule may be "user's GPS location is 40° N and 32° W" and the corresponding action may be "push a shopping mall advertisement to a user's device." In one embodiment, the conditions may include the context parameters included in the defined context profile and a corresponding data (facts). The condition may be correct when the context data 102, received from the context providers 104, corresponding to the context parameter in the condition is same as the data included in the condition of the rule. For example, a condition in a rule may be "temperature is equal to 30 degree Celsius", where temperature is the context parameter and 30 degree Celsius is the data in the condition of the rule. When the context 102 received from context providers 104, for example an IoT device that has sensor to measure temperature or an application that retrieves the current temperature from a temperature website, has a value of 30 degree Celsius then the condition in the rule is true.

The processing of the rule may be initiated based on a trigger 116 to initiate the processing of the rule. In one embodiment, the trigger 116 to initiate the processing of the rule is received when the context processing service 114 receives context data 102 from the context providers 104. For example, a navigation application executing at the portable electronic device 110 may trigger a rile to check whether the user location is near a particular landmark by sending a user's current location. A check may be performed to determine whether the condition in the rule is true. When the condition is true then an action 118 defined for the rule may executed by the context processing service 114. The action 118 may be related to the portable electronic device 110. For example, the action 118 may be to push a message or send an instant message to the portable electronic device 110.

In one embodiment, the context processing service 114 is defined to receive context data 102 from the different devices, included in the context providers 104, using different communication protocols, process the received context data, and then perform an action when a condition of a rule stored in the context processing service is true. The system therefore allows processing of context data received from any type of device, including IoT devices, portable and non-portable electronic devices and then performing an action based on the context data received from these devices.

Figure 2:
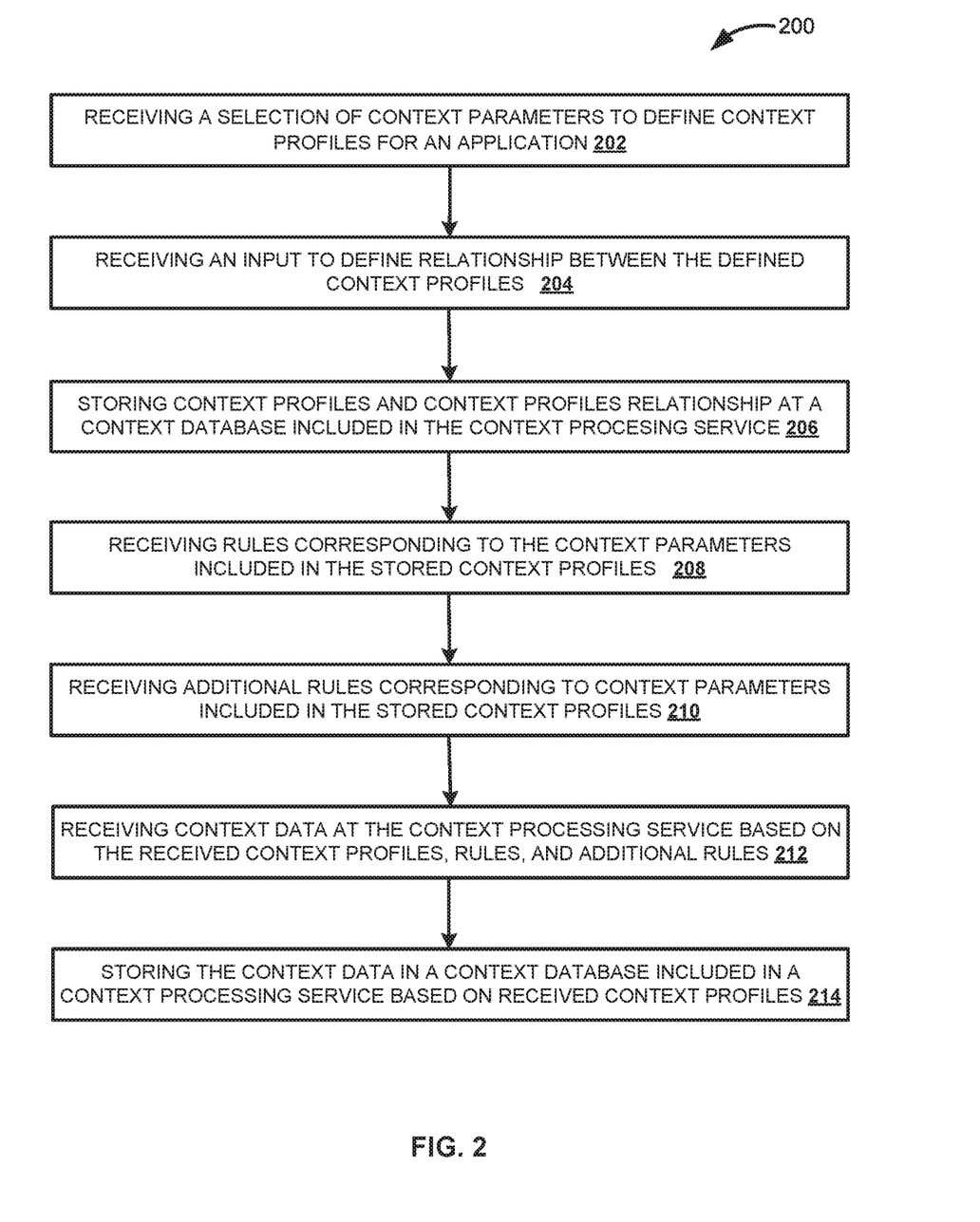
FIG. 2 is a flow diagram illustrating a process to store context profiles and rules for an application in a context database, according to an embodiment.

FIG. 2 is a flow diagram 200 illustrating a process to store context profiles and rules for an application in a context database, according to an embodiment. In one embodiment, the context database may be included in the context processing service.

Initially a selection of context parameters may be received to define context profiles for an application (202). In one embodiment, a context profile defines context data storage for an application. The context profile includes several context parameters. The context data may be received corresponding to different context parameters included in the context profile. The different context parameters may be related to an application. For example, a context profile for a "dress suggestion" application may include context parameters: temperature, location, time of the year, user preferences, etc.

In one embodiment, a list of available context parameters may be displayed at a tooling application. For example, the list of context parameters displayed at the tooling application may include: device parameters (battery, OS, display, etc.), environment parameters that may be captured by the device (temperature, air quality, light, etc.), social status of a user of the device, location of the device, network quality (bandwidth, etc.), user role of a user of the device, health/wellness of the user of the device (physiological measurements etc.), time (time of the day, date, season, etc.), activity of the user of the device (talking, reading, running, etc.), identity of the user of the device, or spatial context data related to the device (orientation, speed, acceleration), etc. In one embodiment, the context parameters may have corresponding sub-categories that may also be displayed at the tooling application. For example, the "identity" context parameter may have corresponding context sub-parameters: Email Address, employee ID, phone number, etc. that may be displayed at the tooling application.

A context profile for the application is defined by selecting context parameters, including the context sub-parameters corresponding to the context parameters, for the context profile. In one embodiment, the context parameters may be selected by a user at the tooling application. The application may be a portable electronic device application, for example, a mobile application that is defined to be executed at the portable electronic device. In one embodiment, an application entity corresponding to the application may be defined in the context processing service. The context profile may be defined for an entity in the context processing service that is mapped to the application.

In one embodiment, the context parameters included in the context profile may receive context data from the different context providers. The context data for an application may include a user context data, a device context data, and an application context data. The context parameters selected for the user context data of an application may be related to different user parameters that are relevant for the application. For example, when the application is a health-related application then a context profile that is to be defined for receiving user context data may select context parameters: user age, user health condition, etc. Similarly, context profiles may include context parameters that may be defined to receive a device context data and an application context data for the application. In one embodiment, the application context data represents application views on a user relevant context data that enables context queries to retrieve context data for the application. In one embodiment, separate context profiles are defined for different users of the application, different devices used for executing the application, for example, an iOS® device or an Android® device, and different instances of the application.

Next an input is received to define relationship between the defined context profiles for the application is received (204). In one embodiment, a context parameter included in one of the context profiles for the application may also be included in other context profiles for the application. In this case, an input from a user at the tooling application may be received to define relationship between the context profile and the other context profile that include the same context parameter. For example, a user context profile for a navigation application may include a user location context parameter that is defined to receive the user location. A device context profile for the navigation application may include the device location context parameter that is defined to receive device location, which may be same as the user location. In this case, an input may be received to define relationship between the user context profile and the device context profile. When an application requests user location or device location then the defined relationship between the user context profile and device context profile allows handling of the request from location data stored either for the user context profile or device context profile.

Next the context profiles for the application, received at 202, and the relationship between the context profiles, received at 204, is stored at a context database included in a context processing service (206). Rules corresponding to the context parameters included in the stored context profiles are then received (208). The rules may be received at an administrator tool from a user. The received rule may be in an event-condition-action format. The event part specifies the signal that triggers the invocation of the rule and the context data for processing the rule. The condition part is a logical test which, when satisfied or evaluated to true, results in execution of an action. The action part consists of one or more steps that are performed when the condition is satisfied. The format of the rule may be "upon condition-when condition-do action." In one embodiment, the event portion of a rule may be a trigger that initiates processing of rule. A trigger may be initiated by: a backend system, the portable electronic device, manually by user, or automatically based on pre-defined conditions. In case of portable electronic device, the event may be triggered based on the context data being sent by the application to a rule execution service included in the context processing service. In case of a manual trigger the rule execution may be performed by an administrator manually. In case of automated triggering the rule may be triggered for automated events based on pre-determined time or threshold value.

The condition part includes several conditions related to the context parameters included in the context profile. The conditions may be true when the context data, received from the context providers, for the context parameters defined in the rule is equal to a value defined for the rule. For example, the condition may include "when the user location is X or in a radius of 5 kilometers from X" in this case the user location is the context parameter and the condition is satisfied when the context data for user location, received from the context providers, is X or X+/−5. The action, executed when the condition is true, may include a push action to push a message to the portable electronic device or an instant message to the portable electronic device. The action may also include sending message, signal or data to a backend system.

Next additional rules corresponding to the context parameters included in the stored context profiles are received (210). In one embodiment, the additional rules are received at an administrator tool from a user. The additional rules may define rules for receiving, storing, and processing context data corresponding to the defined context profiles. For example, the additional rule may be defined to throttle context data storage based on change in context data. In this case, when the user location context data does not change for a certain pre-defined period of time even when the portable electronic device is sending location data every 1-minute, then the user location context data is not stored except for the location context data that is received for the first time from the context providers. In one embodiment, the additional rules may also define that a stored data received from a backend system, which stores previously received context data, is not to be processed at the context processing service.

The additional rules may also include retention rules for retaining previously stored context data and automatically deleting the previously stored context data after a pre-determined period.

The additional rules may also include filters that are defined to filter the context data based on pre-determined conditions. In one embodiment, the filter may be applied to context data to obtain filtered context data. The filtered context data may be provided as facts to the rule for rule execution. The filters may be applied on any of the context parameters. For example, the filter may be applied on user, device, application, date/time range, or frequency context parameter. The filter may also be provided at the portable electronic device to filter or block data received from the context service to the portable electronic device. For example, a filter may be defined for the portable electronic device that blocks beacon data within a particular date/time range to save device battery or not disturb a user at non-work hours. In one embodiment, the filter may be defined with respect to a particular context profile defined for the application.

Next the context data is received, at the context processing service, for the application based on the received context profiles, the rules, and the additional rules defined for the application (212). In one embodiment, the context data is received from different context providers, including devices in an IoT network. Different application program interfaces (APIs) may be provided by the context processing service to communicate and receive data from different devices. Finally, the obtained context data is stored in a context database included in the context processing service based on the received context profiles (214). Based on the context profile, a representational model of context data for an application is provided. The context data is stored and represented based on the representational model. According to the representation model the context data is stored corresponding to either a context profile, a context parameter of the context profile, or a context sub-parameter corresponding to the context profile.

Figure 3:
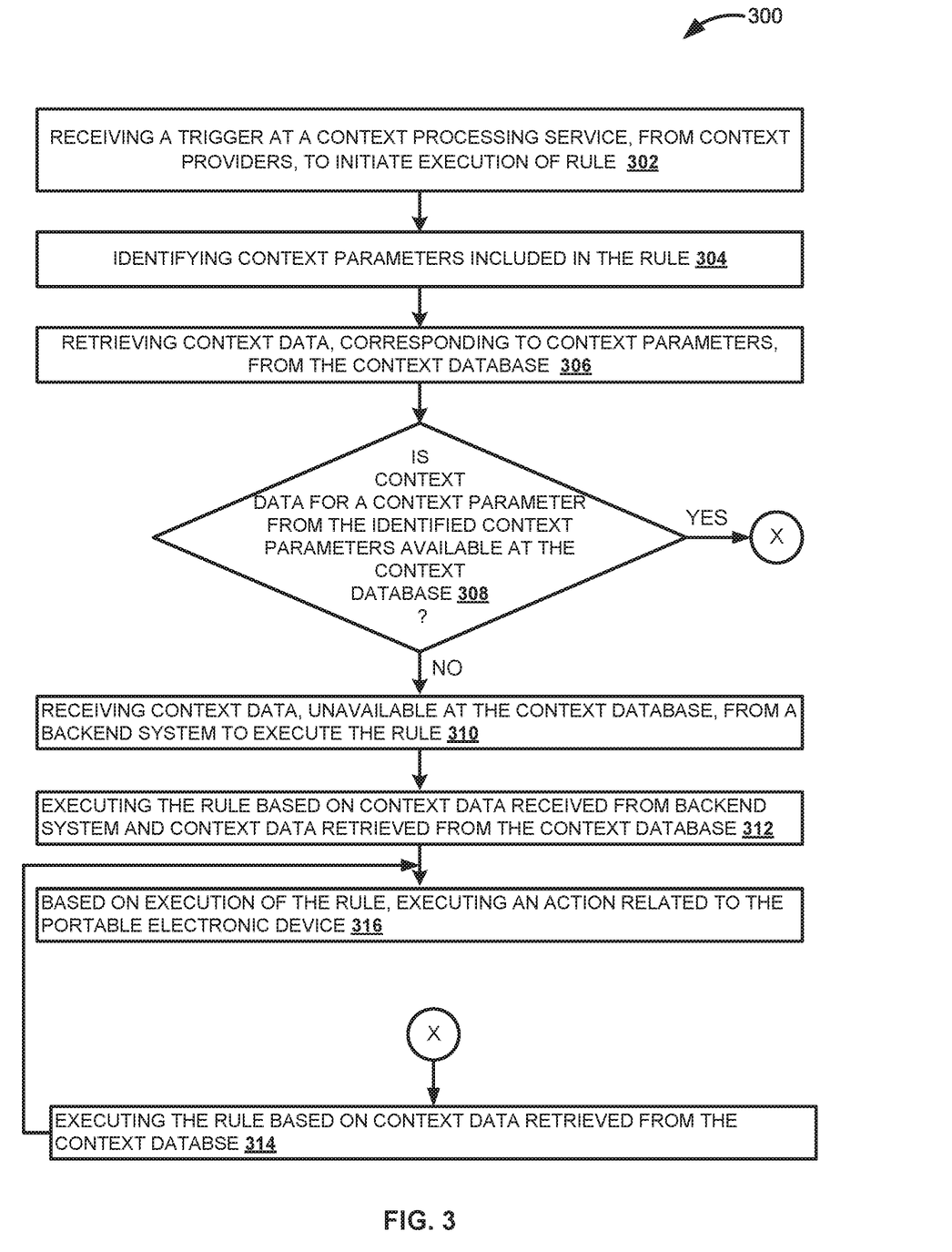
FIG. 3 is a flow diagram illustrating a process to perform actions related to a rule based on context data from an IoT network, according to an embodiment.

FIG. 3 is a flow diagram illustrating a process 300 to perform actions related to a rule based on context data, according to an embodiment. Initially a trigger is received at a context processing service from the context providers to initiate execution of a rule (302). In one embodiment, the trigger may be received when context data is received from the context providers. A rule definition includes a trigger that initiates execution of a rule corresponding the application. The execution of rule may include determining whether a condition included in the rule is true. In one embodiment, the rule may be triggered either automatically, for example, based on context data change, backend event, an event raised by portable electronic device, or by an external cloud service. In one embodiment, the context data is received from the application at the portable electronic device. In this case, the rule may be related to the application, which sends the request to initiate execution of the rule. For example, when the application is a user navigation application then the rule may be related to checking user/device location and then performing a corresponding action.

Next the context parameters included in the rule are identified (304). A condition of the rule includes several context parameters and a condition value. The condition is true when the context data corresponding to the context parameters included in the rule is same as the condition value. For example, the condition may be "user mood is happy". In this case "user mood" is the context parameter and "happy" is the condition value. In one embodiment, the context parameter "user mood" included in the context part of the rule is identified.

Context data corresponding to the identified context parameters are then retrieved from the context database (306). As discussed above at 214 in FIG. 2, context data is stored in context database. The context database stores context data corresponding to the different context parameters included in a context profile of an application. In one embodiment, the context data, stored for the context parameters included in a context profile of the application that requested initiation of execution of rule, is retrieved.

Next a check is performed to determine whether context data for a context parameter, from the identified context parameters, is available at the context database (308). In case the context data is unavailable (condition in 308 is false) then the context data for that context parameter is received from a backend system (310). When the context data for a particular context parameter is not available at the context database then the context data corresponding to this parameter is retrieved from a backend system that stores additional data with respect to the context parameter, external service call, etc.

Next a stored rule corresponding to the context parameters of the context data received from the backend system is executed (312). The context database stores context data for context parameters included in context profiles that are defined for the application. In one embodiment, the context data, of the context parameters that are included in the context profile of the application, are used for executing the application. In case, data for any of the context parameters included in the rule is not stored in the context database then the context data obtained from backend system or any external data sources is used to execute the rule. For example, a rule may be executed to fetch the nearest shops to a device GPS coordinates. In this case, the shop coordinates and the device GPS coordinates may be stored at the context database or may be obtained from external/backend systems. Next a location service API is called to determine shops in the vicinity of the device GPS location, based on the device GPS coordinates and the shop coordinates. The obtained result is then used to execute an action, for example, pushing a message with list of the shops in the vicinity to the portable electronic device.

In case the context data corresponding to the identified context parameters are available (condition in 308 is true) then the rule is executed based on the context data retrieved from the context database (314). Finally, based on the execution of the rule an action related to a portable electronic device is executed (316). The action may include pushing a message or sending an instant message (IM) to the portable electronic device. The action may also include performing an operation at the backend system, for example, storing data obtained after executing the rule to the backend system. In one embodiment, the backend system may be, for example, SAP® Business Intelligence (BI)/Business Warehouse (BW) system, SAP® Enterprise Resource Planning (ERP) system, etc.

Figure 4:
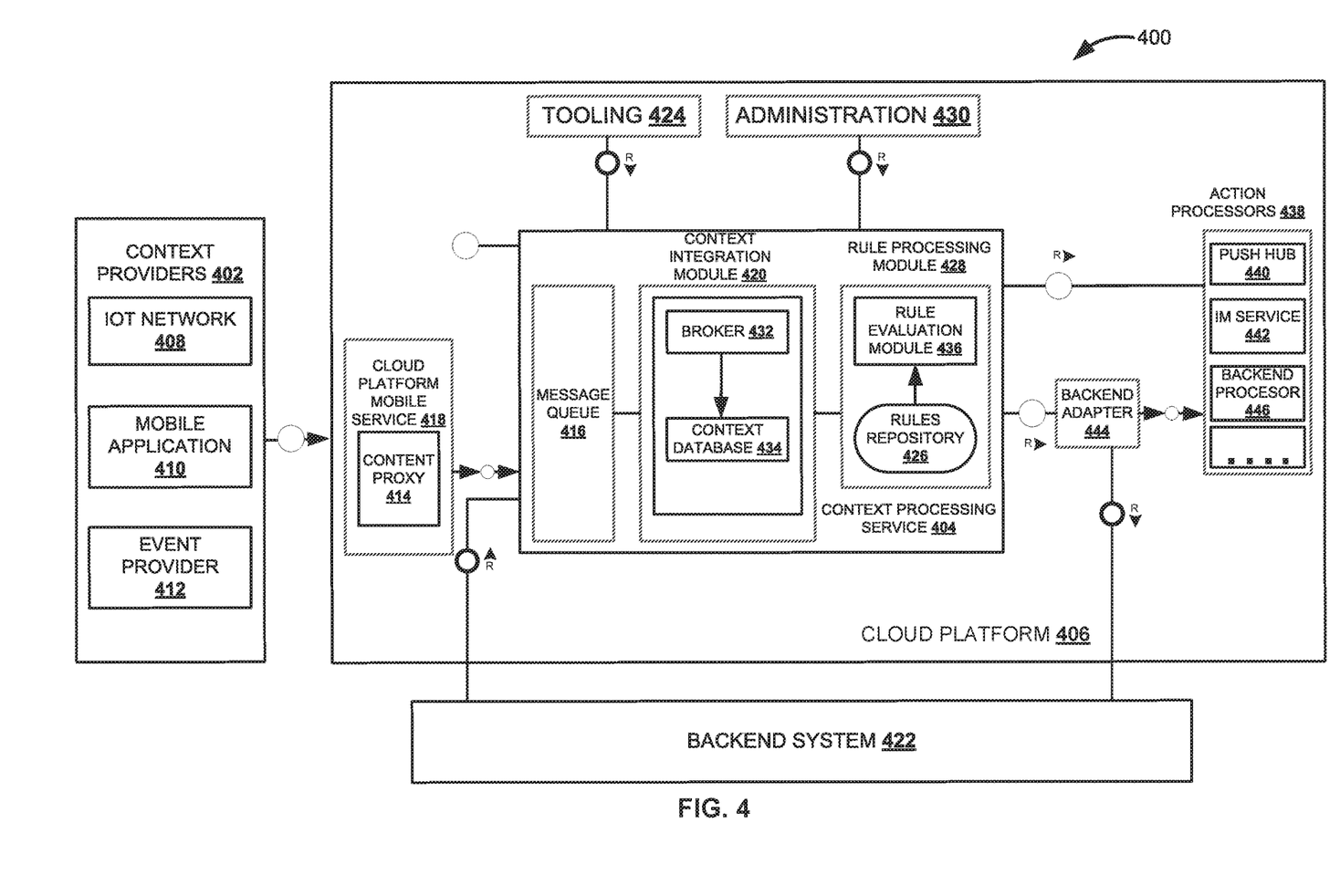
FIG. 4 is a block diagram illustrating a system 400 to perform actions related to a rule based on data received from a context data provider, according to an embodiment.

FIG. 4 is a block diagram illustrating a system 400 to perform actions related to a rule based on context data received from context providers 402, according to an embodiment. In one embodiment, the system 400 is based on a micro-service architecture. Micro-service architecture is an implementation mechanism for service-oriented architectures (SOA) used to build flexible, independently deployable software systems. In one embodiment, the system 400 includes context providers 402 that provide context data to the context processing service 404 deployed at cloud platform 406. The context data may be data corresponding to one of the context parameters included in a context profile corresponding to an application. The context providers may include an IoT network 408 including several IoT devices that have data collecting devices, for example, sensors, actuators, etc. which collect context data and sends the context data to the context processing service 404. The context providers 402 may also include mobile application 410, executing on the portable electronic device, which sends data, for example, GPS location, health data, etc. collected by the portable electronic device or the mobile application 410 to the context processing service 404, and an event provider 412 that sends "event" related to a rule as context data to the context service. The event may specify the signal that triggers the invocation of the rule and the context data for processing the rule.

A context proxy 414 may be defined to transfer the context data from the context providers 402 to a message queue 416 included in the context processing service 404. The context proxy 414 may be hosted at a cloud platform mobile service 418 that exposes different APIs to communicate and receive context data from different context providers 402, for example, different IoT devices in the IoT network 408. The context proxy 414 dispatches context data, along with application context, from context providers 402 to a message queue 416 included in the context processing service 404. The message queue 416 receives context data from various context providers 402 and then transfers the context data to a context integration module 420. The message queue 416 may also receive context data from backend system 422 that forwards the context data to the context integration module 420.

In one embodiment, a tooling application 424 is provided to define the context profiles, for the application, and the different context parameters for the context profiles. The tooling application 424 also allows a user to define rules that are stored in the rules repository 426 included in a rule processing module 428. The cloud platform 406 also includes an administration application 430 that allows viewing, editing, applying or revoking context profile and rules for a particular application.

The context integration module 420 includes a broker 432 that processes the context data based on context profile, context parameters, and filters, and updates the processed context data to the context database 434. The broker 432 also monitors context changes based on event windows, filters, sequence of events, monitors context parameters correlations, detect patterns in the received context data for a particular context parameter, and also generate response based on the received context profile. The broker 432 may also automatically identify context profile for an application that may be modified by the administration application 430. The context data may be stored in a context database 434 that stores and exposes context data for execution of the rule. The context database 432 controls the storage and access of data from the context database 434. For example, the context database 434 may be defined to store context data for a context parameter only when the context data has changed. Further, the context database 434 may also restrict access to all or different portions of context data based on different data security features, for example, user profile, user permissions, data defined as read, write, or private, etc. The context database 434 may also have retention rules that defines retention of historical data related to the different context parameters.

The system 400 also includes a rule evaluation module 436 in the rule, processing module 428 that is defined to trigger execution of the rule when an event corresponding to the rule triggers execution of the rule. The rule evaluation module 436 may identify the rule from the rule repository 426 that stores the rules. When the condition in the identified rule is satisfied then an action corresponding to the rule may be executed. The system 400 includes action processors 438 that handle the actions triggered by execution of the rule. In one embodiment, the action is related to a portable electronic device. In this case, the action processors 438 may include, for example, a push hub 440 that pushes a message to the portable electronic device, an instant message (IM) service 442 that sends an IM to the portable electronic device. The action corresponding to the rule may also be related to a backend system 422, for example, the action may be storing or processing data obtained as a result of executing the action at the backend system 422. In one embodiment, a backend adapter 444 is provided to handle action related to backend system 422. A backend adapter 444 is used to connect and transfer data to the backend system 422. The backend adapter 444 is also adapted to forward data to a backend processor 444 to further process the data. When the action is a data storage action then the backend adapter 444 sends the data to the backend system 422. When the action is processing of data then the backend adapter 444 sends the data to the backend processor 446 included in the action processors 438. The backend processor 446 executes the action to obtain a result data which is then stored at the backend system 422.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
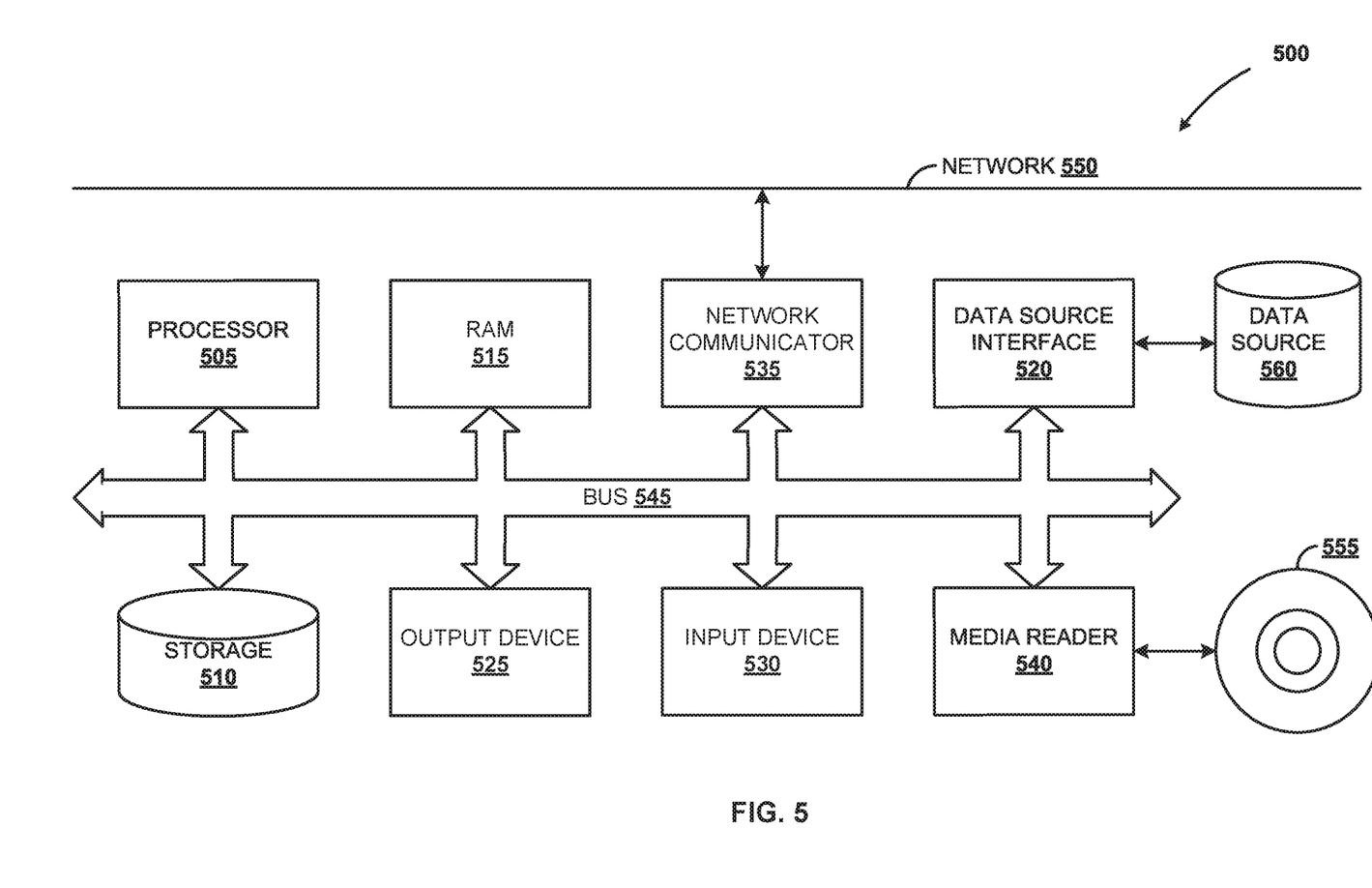
FIG. 5 is a block diagram illustrating an exemplary computer system, according to one embodiment.

FIG. 5 is a block diagram of an exemplary computer system 500. The computer system 500 includes a processor 505 that executes software instructions or code stored on a computer readable storage medium 555 to perform the above-illustrated methods. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to execute a rule based on context data, the method comprising:
    receiving a rule and at least one additional rule corresponding to a plurality of context parameters at a context processing service, wherein the at least one additional rule is associated with a change in location context data related to a location of a user;
    at the context processing service, receiving a trigger to initiate execution of the rule;
    identifying the plurality of context parameters included in the rule;
    retrieving context data corresponding to the plurality of context parameters from a context database, wherein the context data is received from a plurality of context providers including:
        an Internet of Things (IoT) network; and
        an application executing at a portable electronic device;
    based on the retrieved context data, executing the rule at the context processing service;
    based on executing the rule, executing an action corresponding to the rule;
    initially storing location context data in the context database;
    receiving location context data at a pre-determined frequency;
    in response to determining that the received location context data does not change in a pre-determined period, discarding the received location context data without storing the received location context data;
    identifying a change in the received location context data; and
    based on the identified change in the received location context data, storing the changed location context data in the context database.

2. The computer implemented method of claim 1, wherein retrieving the context data corresponding to the plurality of context parameters further comprises:
    determining whether the context data corresponding to a context parameter from the identified plurality of context parameters is available at the context database; and
    based on the determination, retrieving the context data corresponding to the context parameter from the context database.

3. The computer implemented method of claim 2, further comprising:
    retrieving the context data corresponding to the context parameter from a backend system when the context data corresponding to a context parameter from the identified plurality of context parameters is unavailable at the context database; and
    executing the rule based on context data retrieved from the context database and the backend system.

4. The computer implemented method according to claim 3, wherein performing the action includes:
    processing data obtained as a result of executing the action corresponding to the rule; and
    sending the processed data to the backend system.

5. The computer implemented method according to claim 1, wherein receiving the trigger to initiate execution of the rule comprises:
    receiving the trigger to initiate execution of the rule when the context data is received from the plurality of context providers.

6. The computer implemented method according to claim 1, wherein executing the action includes:
    pushing one or more messages to the portable electronic device executing the application.

7. The computer implemented method according to claim 1, further comprises:
    based on the at least one additional rule, processing data obtained as a result of executing the action corresponding to the rule.

8. A computer system comprising:
    at least one memory to store executable instructions; and
    at least one processor communicatively coupled to the at least one memory, the at least one processor configured to execute the executable instructions to:
        receive a rule and at least one additional rule corresponding to a plurality of context parameters at a context processing service, wherein the at least one additional rule is associated with a change in location context data related to a location of a user;
        receive a trigger to initiate execution of a rule;
        identify the plurality of context parameters included in the rule;
        retrieve context data corresponding to the plurality of context parameters from a context database, wherein the context data is received from a plurality of context providers including:
            an Internet of Things (IoT) network; and
            an application executing at a portable electronic device;
        based on the retrieved context data, execute the rule;
        based on executing the rule, execute an action corresponding to the rule;
        initially store location context data in the context database;

receive location context data at a pre-determined frequency;

in response to determining that the received location context data does not change in a pre-determined period, discard the received location context data without storing the received location context data;

identify a change in the received location context data; and based on the identified change in the received location context data, store the changed location context data in the context database.

9. The computer system according to claim 8, further comprising instructions to:

determine whether the context data corresponding to a context parameter from the identified plurality of context parameters is available at the context database; and based on the determination, retrieve the context data corresponding to the context parameter from the context database.

10. The computer system according to claim 9, further comprising instructions to:

retrieve the context data corresponding to the context parameter from a backend system when the context data corresponding to a context parameter from the identified plurality of context parameters is unavailable at the context database; and execute the rule based on context data retrieved from the context database and the backend system.

11. The computer system according to claim 10, further comprising instructions to:

process data obtained as a result of executing the action corresponding to the rule; and send the processed data to the backend system.

12. The computer system according to claim 8, further comprising instructions to:

receive the trigger to initiate execution of the rule when the context data is received from the plurality of context providers.

13. The computer system according to claim 8, further comprising:

push one or more messages to the portable electronic device executing the application.

14. The computer system according to claim 8, further comprising:

based on the at least one additional rule, process data obtained as a result of executing the action corresponding to the rule.

15. A non-transitory computer-readable medium to store instructions, which when executed by a computer, causes the computer to:

receive a rule and at least one additional rule corresponding to a plurality of context parameters at a context processing service, wherein the at least one additional rule is associated with a change in location context data related to a location of a user;

receive a trigger to initiate execution of the rule;

identify the plurality of context parameters included in the rule;

retrieve context data corresponding to the plurality of context parameters from a context database, wherein the context data is received from a plurality of context providers including:

an Internet of Things (IoT) network; and an application executing at a portable electronic device;

based on the retrieved context data, execute the rule;

based on executing the rule, execute an action corresponding to the rule;

initially store location context data in the context database;

receive location context data at a pre-determined frequency;

in response to determining that the received location context data does not change in a pre-determined period, discard the received location context data without storing the received location context data;

identify a change in the received location context data; and based on the identified change in the received location context data, store the changed location context data in the context database.

16. The non-transitory computer-readable medium according to claim 15 to store instructions, which when executed by a computer, causes the computer to:

determine whether the context data corresponding to a context parameter from the identified plurality of context parameters is available at the context database; and based on the determination, retrieve the context data corresponding to the context parameter from the context database.

17. The non-transitory computer-readable medium according to claim 16 to store instructions, which when executed by a computer, causes the computer to:

retrieve the context data corresponding to the context parameter from a backend system when the context data corresponding to a context parameter from the identified plurality of context parameters is unavailable at the context database; and execute the rule based on context data retrieved from the context database and the backend system.

18. The non-transitory computer-readable medium according to claim 17 to store instructions, which when executed by a computer, causes the computer to:

process data obtained as a result of executing the action corresponding to the rule; and send the processed data to the backend system.

19. The non-transitory computer-readable medium according to claim 15 to store instructions, which when executed by a computer, causes the computer to:

receive the trigger to initiate execution of the rule when the context data is received from the plurality of context providers.

20. The non-transitory computer-readable medium according to claim 15 to store instructions, which when executed by a computer, causes the computer to:

push one or more messages to the portable electronic device executing the application.

* * * * *